United States Patent [19]

Trofimov et al.

[11] 3,915,041

[45] Oct. 28, 1975

[54] FLYING CUTTER OF AUTOMATIC ROD STRAIGHTENING-AND-CUTTING MACHINE

[76] Inventors: Igor Dmitrievich Trofimov, ulitsa Mosfilmovskaya, 25, kv. 78; Nukhim Mikhelevich Bukher, ulitsa Bolshaya Cherkizovskaya, 10, korpus 2, kv. 102; Boris Pavlovich Morozov, ulitsa Erevanskaya, 12, korpus 4, kv. 41, all of Moscow, U.S.S.R.

[22] Filed: Oct. 22, 1974

[21] Appl. No.: 517,010

[52] U.S. Cl. .................. 83/320; 83/310; 83/311; 83/580
[51] Int. Cl.² ................................. B23D 25/04
[58] Field of Search ............ 83/320, 318, 319, 310, 83/311, 580

[56] References Cited
UNITED STATES PATENTS
3,218,900  11/1965  Jones .............................. 83/320 X
3,859,881  1/1975  Hawley ............................ 83/320

*Primary Examiner*—J. M. Meister
*Attorney, Agent, or Firm*—Lilling & Siegel

[57] ABSTRACT

The cutter comprises two relatively displacing blades, one of them made in the form of a bushing and rigidly secured on a carriage adapted for reciprocating motion in the direction of material feed, while the other blade is installed for possible displacement in the course of cutting in the direction perpendicular to carriage travel. The cutter also comprises a drive for simultaneous displacement of the carriage and the blade, which is displaced in the course of cutting in the direction perpendicular to carriage travel. The drive according to the invention comprises two crank and connecting-rod mechanisms which are so installed that the connecting rod of one mechanism is positioned essentially vertically, while the connecting rod of the other mechanism is positioned essentially horizontally and with its end pivotally connected to the vertical connecting rod, which in its turn, is pivotally connected to the carriage through a lever, a axle connecting the lever to the vertical connecting rod, thus displacing the blade in a direction perpendicular to the carriage travel. The proposed cutter features low inertia potential and consequently higher productivity as compared with known flying cutters of a similar type.

4 Claims, 7 Drawing Figures

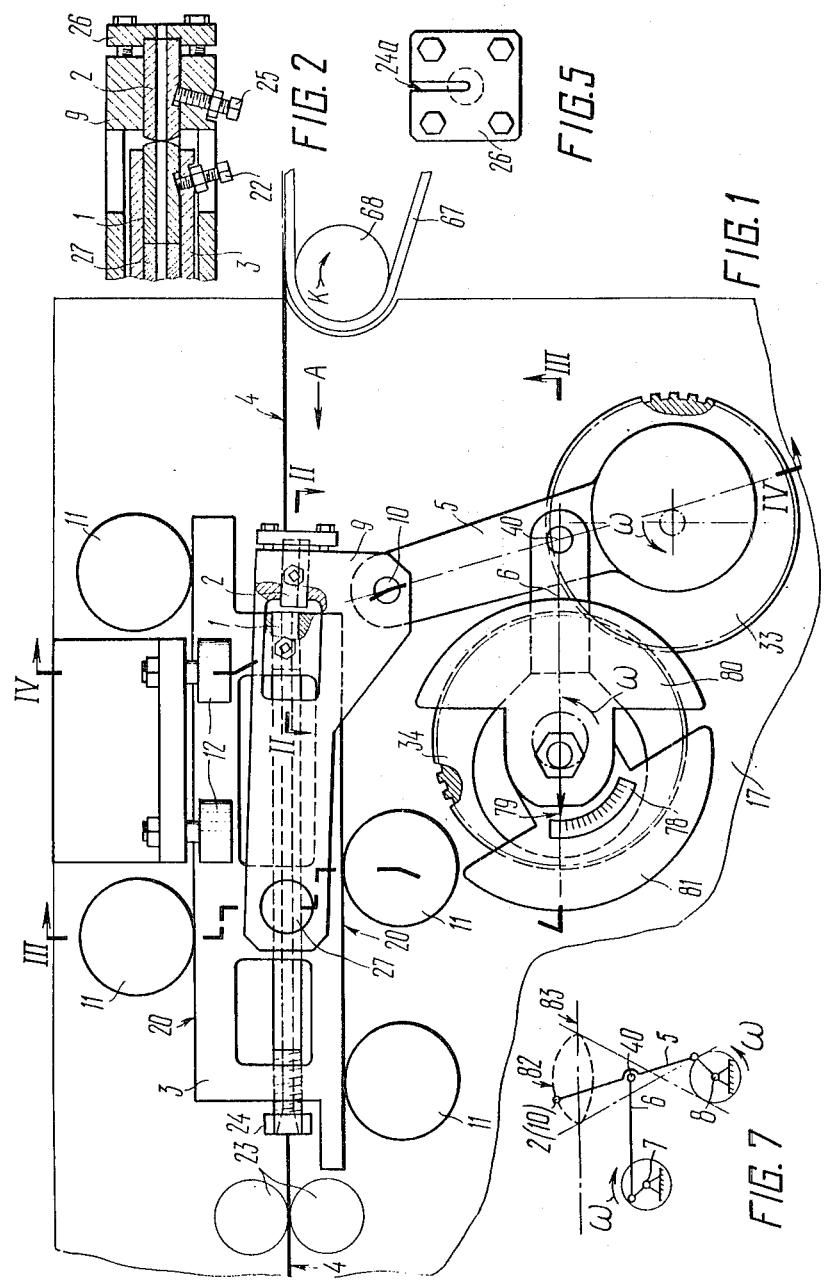

FLYING CUTTER OF AUTOMATIC ROD STRAIGHTENING-AND-CUTTING MACHINE

The present invention relates to forging and pressing machinery and more exactly to flying cutters of automatic rod straightening-and-cutting machines.

The invention can be successfully employed for producing electrodes.

Besides, the present invention can be utilized for producing bar-like rods of round or shaped cross-section.

A known flying cutter of automatic rod straightening-and-cutting machine comprises two relatively displacing blades, one of them made in the form of a bushing and rigidly fixed on a carriage adapted for reciprocating motion along the guide-members of the base in the direction of forced delivery of material through this bushing.

The other blade is fixed on a slide block installed on the guide members of the carriage for possible movement together with the blade in the course of cutting in the direction perpendicular to that of carriage travel.

Simultaneous movement of the carriage together with the blade in the form of a bushing and the blade movably installed on the slide block to cut continuously delivered material into blanks of preset length is effected by the drive consisting of two independent drive units.

One of the drive units imparts longitudinal reciprocating motion to the carriage, the other lateral motion to the slide block and consequently to the blade secured thereon.

The carriage drive unit comprises a double-arm lever connected to one of its arms through a swinging lever to the carriage, and two crankshafts rotating in the common direction at the same angular velocity. One of the crankshafts constitutes a support for the double-arm lever, while the other is pivotally connected through a connecting rod to the other arm of this lever.

The slide block drive unit also comprises a crankshaft and a connecting rod which is pivotally connected to the slide block. This crankshaft rotates at an angular velocity which is equal in value and opposite in direction to the rotating speed of the crankshaft constituting the support for the double-arm lever of the carriage drive unit.

It is commonly known that progressively moving masses are of a much higher inertia potential than those in swinging motion.

The fact that the known flying cutter incorporates the slide block progressively moving along the slide members of the carriage, as well as the independent carriage and slide block drive units, substantially increases inertia of the mechanism on the whole, thus limiting its productivity.

In addition, the reciprocating masses are not dynamically balanced by any spectral arrangement in the known mechanism, which limits the speed and frequency of strokes of the carriage, thus also impairing the productivity.

Matching the carriage speed at the moment of cutting and that of continuously delivered material when the latter speed varies is achieved by adjusting the stroke of the carriage. In the known mechanism, the stroke of the carriage is adjusted by relative turning through a certain angle of two crankshafts rotating in one direction. To achieve this, the couplings seated on these shafts should be disconnected.

The necessity of adjusting relative positioning of two crankshafts simultaneously for the purpose of varying the stroke of the carriage causes much inconvenience and makes adjustment and tuning of the known cutter more complicated.

The principal object of the invention is to provide such a flying cutter of automatic rod straightening-and-cutting machine, whose drive for simultaneous displacement of the blades would make this cutter be of lower inertia potential and consequently more productive.

This and other objects are achieved by provision of a flying cutter of automatic rod straightening-and-cutting machine, comprising two relatively displacing blades, one of them, made in the form of a bushing, is rigidly fixed on a carriage adapted for reciprocating motion in the direction of forced delivery of material through this bushing, while the other blade is installed for possible displacement in the course of cutting in the direction perpendicular to that of carriage travel, and a drive for simultaneous displacement of the latter blade and the carriage and, according to the invention, this drive comprises two crank and connecting-rod mechanisms with the crankshafts rotating towards each other at similar angular velocity and installed so that the connecting rod of one mechanism is positioned essentially vertically, while the connecting rod of the other one is positioned essentially horizontally and with one end pivotally connected to the vertical connecting rod, which is also pivotally connected to the carriage through a lever, a axle connecting this lever to the vertical connecting rod, and displaces the blade in the course of cutting in the direction perpendicular to that of carriage travel.

Due to this design of the drive for cooperative displacement of the carriage and the movably installed blade the hereby proposed flying cutter is of low inertia potential and consequently of higher productivity as compared with known flying cutters of a similar type. For simpler adjustment of the stroke of the carriage so as to match its speed at the moment of cutting to the speed of material delivered and for dynamic balancing of the reciprocating masses within the entire range of carriage stroke adjustment it is expedient to install an eccentric bushing on the crank of the crankshaft of the crank and connecting-rod mechanism, the turning angle of the bushing relative to the crank axis determining the extent of the carriage stroke.

For the purpose of fixing the turning angle of the eccentric bushing relative to the crank axis the eccentric bushing may be installed on the crank by means of a jaw coupling whose driving portion is seated on splines made on the cantilever end of the crank.

Use of the jaw coupling and splines affords rigid junction of the eccentric bushing and the crank, simple structure solution and convenient adjustment when the mode of operation of the cutter changes.

It is known that balancing of the crank and connecting-rod mechanism is effected by a balancer connected to the crankshaft and offset at a distance from the crankshaft axis of rotation.

In case of using the crank and connecting-rod mechanism with adjustable crank radius a balancer is employed connected to the crankshaft and adjustable in mass or in its offset distance from the crankshaft axis of rotation.

In the proposed cutter this may be achieved by providing two balancers, one of them rigidly connected to the crankshaft of the crank and connecting-rod mechanism, having the horizontal connecting rod, and the other rigidly connected to the eccentric bushing, thus achieving dynamic balancing of the entire cutter through the full range of carriage stroke adjustment.

In order to make the present invention more readily understood an actual embodiment thereof will now be described in more detail with reference to the accompanying drawings, in which:

FIG. 1 is a general view, from the side of attendance, of the flying cutter of automatic rod straightening-and-cutting machine, according to the invention;

FIG. 2 is a sectional view taken along the line II—II in FIG. 1;

FIG. 5 is a view along arrow A in FIG. 1;

FIG. 7 is a view along arrow B in FIG. 6.

Figure 3:
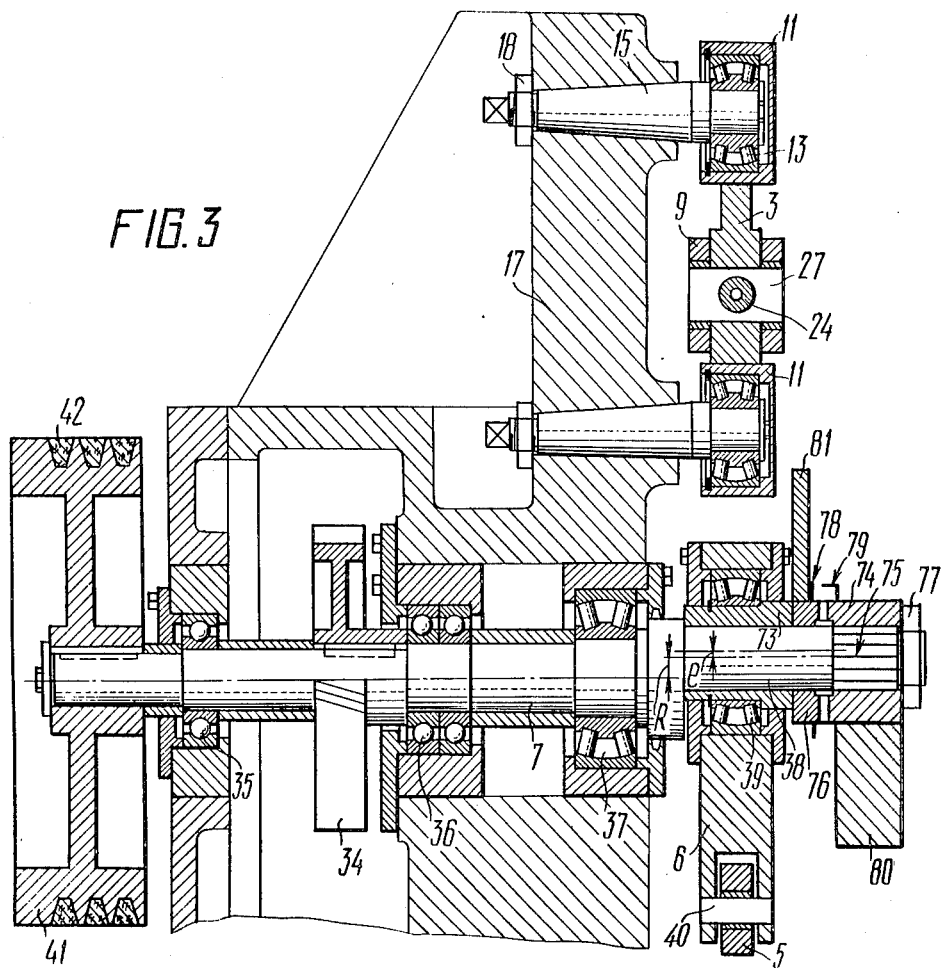
FIG. 3 is a sectional view taken along the line III—III in FIG. 1.

The proposed flying cutter of an automatic straightening-and-cutting machine for producing rods, particularly electrodes, comprises two relatively displacing blades 1 and 2 (FIGS. 1 and 2). One blade 1 takes the form of a bushing rigidly secured on a carriage 3 (FIG. 1) which is adapted for reciprocating motion in the direction of forced delivery of a material 4 through this bushing. The other blade 2 is installed for possible displacement in the course of cutting in the direction perpendicular to that of the travel of the carriage 3. In addition, the proposed cutter comprises a drive for simultaneous movement of the carriage 3 together with the blade 1, and of the other blade 2.

According to the invention, said drive comprises two crank and connecting-rod mechanisms installed so that a connecting rod 5 of one mechanism is disposed essentially vertically, whereas a connecting rod 6 of the other mechanism is disposed essentially horizontally. The crank and connecting-rod mechanisms incorporate crankshafts 7 (FIG. 3) and 8 (FIG. 4) rotating towards each other at similar angular velocity ω, herewith the horizontal connecting rod 6 (FIG. 1) is pivotally connected with its end to the vertical connecting rod 5 which, in its turn, is pivotally connected at the other end to the carriage 3 through a lever 9, a axle 10 connecting the lever 9 to the vertical connecting rod 5, thus moving the blade 2 in a direction perpendicular to that of the travel of the carriage 3.

Figure 4:
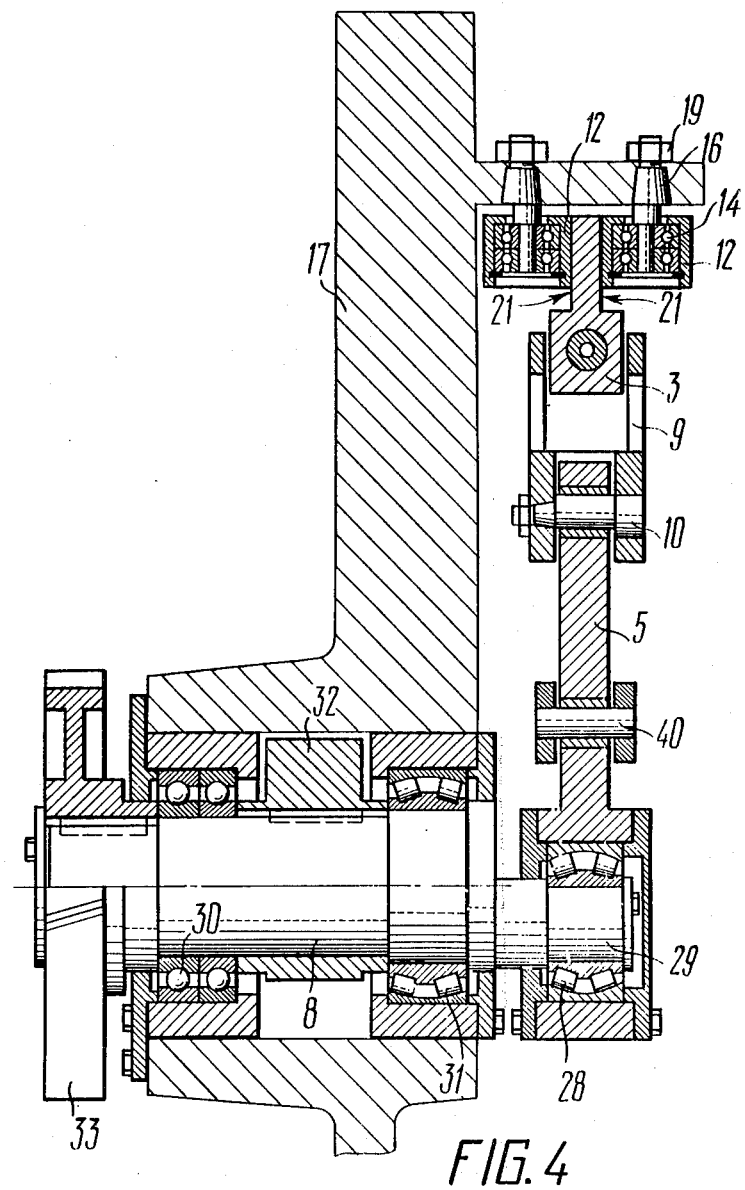
FIG. 4 is a sectional view taken along the line IV—IV in FIG. 1.

The carriage 3 represents a rigid frame which during its motion is displaced over horizontal and vertical guide rolls 11 (FIG. 1) and 12, respectively, which through the medium of antifriction bearings 13 (FIG. 3) and 14 (FIG. 4) are installed on eccentric axles 15 (FIG. 3) and 16 (FIG. 4) fixed in a base 17 (FIGS. 3, 4) of the cutter by means of nuts 18 (FIG. 3) and 19 (FIG. 4). The eccentric axles 15 and 16 may be turned to adjust the position of the carriage 3 in relation to the base 17 and the delivery axis of the material 4 (FIG. 1) and also to adjust the rate of interference between the rolls 11 and 12 and the guide surfaces 20 and 21 (FIG. 4), respectively, of the carriage 3.

The blade 1 (FIG. 2) made in the form of a bushing, is rigidly secured in a seat of the carriage 3 and fixed thereon by a screw 22.

The material 4 (FIG. 1) is positively delivered through a hole in the blade 1 (bushing) by means of rolls 23 which are in kinematic connection with the cutter drive. The material 4 during its travel from the feed rolls 23 towards the blade 1 is guided by a threaded bushing 24 rigidly fixed in the carriage 3.

The other blade 2 has a single-side through slot 24a (FIG. 5) located coaxially with the hole in the bushing and by means of a screw 25 (FIG. 2) and a clamping strip 26 is fixed in a seat of the lever 9 pivotally connected to the carriage 3 by an axle 27 (FIG. 3).

Position of the axle 27 in the carriage 3 is fixed by the threaded bushing 24.

When the lever 9 (FIG. 1) swings relative to the axle 27 secured on the lever 9 the blade 2 interacts with the blade 1 secured on the carriage 3 and at the movement of cut moves practically perpendicularly to the travel of the carriage 3.

The lever 9 with its other end by means of an axle 10 is connected to the vertical connecting rod 5 which through the medium of bearings 28 (FIG. 4) is slipped upon a crank 29 of the crankshaft 8 rotating in bearings 30 and 31 installed in the base 17. Rigidly secured on the crankshaft 8 between said bearings is a balancer 32 to equalize the unbalanced masses of the corresponding crank and connecting-rod mechanism, having the vertical connecting rod 5.

Fixed in cantilever manner on the crankshaft 8 at the side opposite to the crank 29 is a gear wheel 33 which is meshed with a gear wheel 34 (FIG. 3) fixed on the other crankshaft 7 rotating in antifriction bearings 35, 36, 37 installed in the base 17.

Gear ratio of the gear wheels 33 (FIG. 4) and 34 (FIG. 3) is equal to unity and because of this the crankshafts 7 and 8 (FIG. 4) rotate towards each other at equal angular velocities ω (FIGS. 1, 7).

Mounted on the crank 38 (FIG. 3) of the crankshaft 7 in bearings 39 is the horizontal connecting rod 6 connected by an axle 40 to the vertical connecting rod 5.

Figure 6:
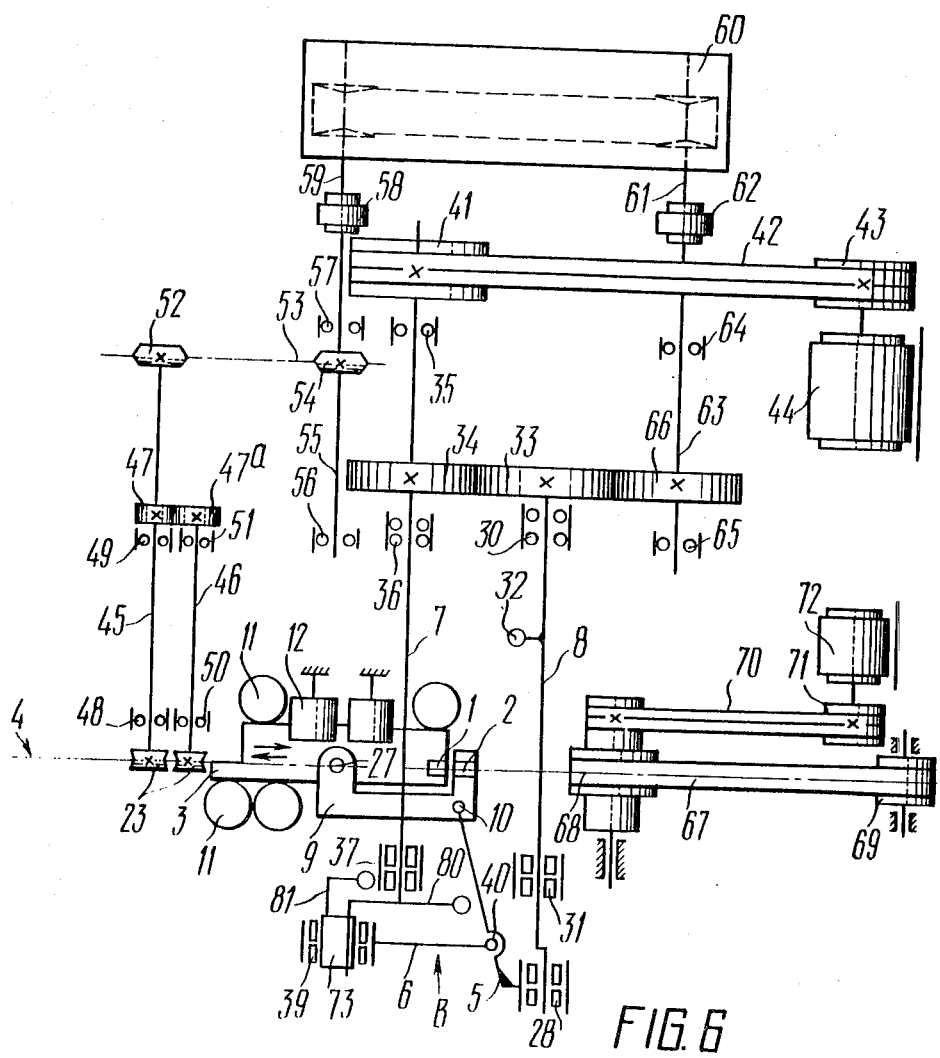
FIG. 6 is a power-flow diagram of the flying cutter of automatic rod straightening-and-cutting machine, according to the invention.

Rigidly fixed on the other end of the crankshaft 7 is a pulley 41 receiving rotation through V-belts 42 from a pulley 43 (FIG. 6) fixed on the shaft of an electric motor 44.

The feed rolls 23 are seated in cantilever manner on shafts 45 and 46 geared to each other through the medium of gear wheels 47 and 47a. The shafts 45 and 46 rotate in antifriction bearings 48, 49 and 50, 51 respectively, installed in the base 17.

The shaft 45 is rotated from a sprocket 52 fixed on it in cantilever manner, the sprocket in its turn, is rotated by a chain 53 from a sprocket 54 seated on a shaft 55 rotating in antifriction bearings 56 and 57 installed in the base 17.

The shaft 55 through a coupling 58 is connected to an output shaft 59 of a chain type speed variator 60.

An input shaft 61 of the speed variator 60 through a coupling 62 is connected to a shaft 63 rotating in antifriction bearings 64 and 65 installed in the base 17. Rigidly fixed on the shaft 63 is a gear wheel 66 which is in mesh with a gear wheel 33 which is in mesh with a gear wheel 34.

The above described kinematic arrangement between the material feed mechanism and the cutter permits, by way of changing the transmission ratio of the chain type speed variator 60, varying the feed speed of the continuously delivered material 4 consequently varying the length of rod cut off per each double-stroke (forward and reverse) of the carriage 3.

Cut-off lengths of rod are removed from the automatic machine by means of a conveyor whose belt 67 runs over two pulleys 68 and 69 rotating on antifriction bearings (not shown in the drawings).

Rotation (in the direction of arrow K in FIG. 1) to the pulley 68 is transmitted by V-belts 70 (FIG. 6) from a pulley 71 fixed on the shaft of an electric motor 72. The conveyor speed is adjusted synchronously with the material feeding speed.

To match the delivery speed of the material 4 and the travel speed of the carriage 3 the crank 38 (FIG. 3) of the crankshaft 7 of the crank and connecting-rod mechanism, having the horizontal connecting rod 6, according to the invention, mounts an eccentric bushing 73 whose turning angle relative to the axis of the crank 38 determines the extent of travel (stroke) of the carriage 3. The connecting rod 6 is connected to the crank 38 through the eccentric bushing 73 and bearing 39 rigidly fixed thereon. The stroke length of the carriage 3 is changed as a result of varying the radius of the crank 38 of the crank and connecting-rod mechanism, having the horizontal connecting rod 6, when the eccentric bushing 73 is turned.

The value of the radius of the crank and connecting-rod mechanism, having the horizontal connecting rod 6, is made up of a constant of radius "R" of the crank 38 and a variable value of eccentricity "$l$" of the eccentric bushing 73 when the latter is turned around the axis of the crank 38.

For the purpose of fixing the turning angle of the eccentric bushing 73 relative to the axis of the crank 38 the bushing 73 is installed on the crank 38 with the help of a jaw coupling. Here, a driving portion 74 of the jaw coupling is seated on splines 75 made on the cantilever end of the crank 38.

One end of the eccentric bushing 73 rests against the shoulder of the crankshaft 7 while the other end, according to the invention is rigidly (integrally) connected to a driven portion 76 of the jaw coupling which is joined with the driving portion 74 of the jaw coupling. The driving portion 74 takes the form of a splined bushing fixed on the cantilever end of the crank 38 by a nut 77. The driven portion 76 of the jaw coupling mounts a scale 78 for adjusting radius $R + l$ of the crank 38 of the crank and connecting-rod mechanism, having the horizontal connecting rod 6, while the driving portion 74 of the jaw coupling mounts a pointer 79.

Use of the jaw coupling and splines affords rigid junction between the eccentric bushing 73 and the crank 38 and, in addition, what is important, provides for simple structural solution and convenient adjustment of the cutter when the mode of its operation is changed.

The flying cutter comprises two balancers 80 and 81 (FIG. 3), both rigidly connected, one 80 to the crank 38 of the crankshaft 7, the other 81 to the eccentric bushing 73, thus dynamically balancing the cutter within the entire range of travel (stroke) of the carriage 3.

The balancer 80 is rigidly connected to the driving portion 74 of the jaw coupling, while the balancer 81 is rigidly connected to the eccentric bushing 73.

The mass of each balancer 80 and 81 is determined by way of calculation, proceeding from the mass of the cutter parts and the values of the constant portion of radius of the crank 38 and its variable portion depending on the value of eccentricity "$l$" of the eccentric bushing 73.

The straightening-and-cutting machine with flying cutter operates as follows.

The electric motor 44 (FIG. 6) through the pulleys 43 and 41, V-belt 42, and gear wheels 34 and 33 transmits rotation to crankshafts 7 and 8, respectively, for their synchronous rotation towards each other. These shafts 7 and 8, in their turn, transmit power through the horizontal 6 and vertical 5 connecting rods and lever 9 to impart reciprocating motion to the carriage 3 which mounts the blade 1 of the cutter. The other blade 2 co-operating at the moment of cutting with the blade 1 and fixed on the lever 9 circumscribes during carriage travel an ellipsoidal trajectory 82 shown in FIG. 7 by the dash-and-dot line.

The upper (as shown in the drawing) portion of the trajectory 82 of the blade 2 is located above the axis 83 of the feeding material 4, which is the axis of the bushing of the blade 1, while the lower portion of the trajectory 82 is below this material feeding axis 83; the upper portion of the trajectory 82 being circumscribed by the blade 2 at the forward stroke of the carriage 3, while the lower portion at the reverse stroke of the carriage 3.

In the upper portion of the trajectory 82 the blade 2 moves upwards and in the direction of the feeding material 4, whereas in the lower portion of the trajectory 82 it moves downwards and opposite to the direction of the feeding material 4.

Due to this character of the trajectory 82 of the blade 2 the material 4 is cut off at the forward stroke of the carriage 3 with the material 4 being freely and continuously delivered for feeding at the reverse stroke of the carriage 3, thus allowing the material to be cut off with a minimal number of kinematic links in the cutter and by their swinging motion.

Continuous delivery of the feed material 4 is effected by the feed rolls 23 seated on the shafts 45 and 46 which receive rotation from the cutter through the gear wheels 33 and 66, shaft 63, coupling 62, chain type speed variator 60, another coupling 58, shaft 55, sprockets 52, 54 and chain 53.

The material 4 passes through the guide bushing 24 and then the blade 1. During the forward stroke of the carriage 3 the blank is cut off by the blades 1 and 2. The cut-off blank is brought onto the conveyor belt 67 and carried away from the automatic machine.

The actual cutting of the material is performed at the end of the upward motion of the blade when the speed of the carriage 3 carrying the blades 1 and 2 matches the speed of the material 4 both in value and direction.

Matching the speed of the carriage 3 and that of the material 4 is achieved by setting the definite carriage stroke by varying radius $R + l$ of the crank 38 of the crank and connecting-rod mechanism, having the horizontal connecting rod 6.

The radius of the crank 38 is adjusted by turning the eccentric bushing 73 through a definite angle (depending on the material feeding speed) relative to the axis of the crank 38 for which purpose the driving portion 74 of the jaw coupling should be disengaged from the drive portion 76 thereof.

Because one cut is performed for every double-stroke (forward and reverse) of the carriage 3 the length of the cut-off blank is determined by the extent of material delivered during one double-stroke of the carriage.

Varying the radius $R + l$ of the crank 38 by turning the eccentric bushing 73 relative to the axis of the crank 38 is accompanied by simultaneous displacement of the balancer 81, which is rigidly connected to the eccentric bushing 73, relative to the balancer 80, which remains stationary in relation to the axis of the crank 38.

This relative displacement of the balancers 80 and 81 helps achieve dynamic balancing of the cutter within the entire range of adjusting radius $R + l$ of the crank 38 and, consequently, of the stroke of the carriage 3.

Thus, the above disclosed embodiment of the flying cutter is characterized by the minimal number of kinematic links, the single drive made up of two interlinked crank and connecting-rod mechanisms, swinging motion of the blade moving in the course of cutting in the direction perpendicular to the travel of the carriage to achieve low inertia potential and consequently high productivity of the cutter.

Also of advantage in the proposed cutter is that the use of two adjustable balancers makes it possible to effect dynamic balancing of the cutter within the entire range of carriage stroke adjustment which is also conducive to higher productivity of the cutter.

What we claim is:

1. A flying cutter of an automatic rod straightening-and-cutting machine with a means for feeding rod material to said cutter, comprising; a carriage adapted for reciprocating motion in the direction of material feeding by said means; a lever with its one end pivotally connected to said carriage; two relatively displacing blades, one of them rigidly secured on said carriage and made in the form of a bushing through which material is delivered, the other of said blades fixed on said lever for possible displacement in the course of cutting in the direction perpendicular to that of said carriage travel; a drive for simultaneous displacement of said carriage and said second blade; two crank and connecting-rod mechanisms of said drive with crankshafts rotating towards each other at similar angular velocity, a connecting rod of one of said crank and connecting-rod mechanisms, positioned essentially vertically and pivotally connected with its end to the free end of said lever; a connecting rod of the other of said crank and connecting-rod mechanisms, positioned essentially horizontally and pivotally connected with its end to said vertical connecting rod; said second blade fixed on said lever close to a joint connecting this lever to said vertical connecting rod.

2. A flying cutter as set forth in claim 1, wherein the crank of the crank and connecting-rod mechanism, having the horizontal connecting rod, includes an eccentric bushing whose turning angle relative to the axis of the crank determines the extent of carriage travel.

3. A flying cutter as set forth in claim 2, wherein the eccentric bushing is mounted on the crank by means of a jaw coupling whose driving portion is seated on splines made on the cantilever end of the crank.

4. A flying cutter as set forth in claim 3, wherein provision is made for two balancers, rigidly connected, one to the crank of the crankshaft of the crank and connecting-rod mechanism having the horizontal connecting rod, the other to the eccentric bushing installed on said crank to achieve dynamic balancing of the cutter within the entire range of carriage travel adjustment.

* * * * *